US007548412B2

(12) United States Patent
Korczynski

(10) Patent No.: US 7,548,412 B2
(45) Date of Patent: Jun. 16, 2009

(54) SWITCHABLE FUSED POWER DISTRIBUTION BLOCK

(75) Inventor: Jacek Michael Korczynski, Niles, IL (US)

(73) Assignee: Cooper Technologies Company, Houston, TX (US)

(*) Notice: Subject to any disclaimer, the term of this patent is extended or adjusted under 35 U.S.C. 154(b) by 386 days.

(21) Appl. No.: 11/044,796

(22) Filed: Jan. 27, 2005

(65) Prior Publication Data

US 2006/0164797 A1 Jul. 27, 2006

(51) Int. Cl.
*H01H 85/02* (2006.01)
*H02B 1/26* (2006.01)

(52) U.S. Cl. ...................................... 361/626; 337/189

(58) Field of Classification Search ................ 361/626; 337/189

See application file for complete search history.

(56) References Cited

U.S. PATENT DOCUMENTS 4,403,155 A * 9/1983 Aoki et al. ................. 307/10.1
5,032,092 A 7/1991 Linn
5,658,172 A 8/1997 Schmidt et al.
6,176,747 B1 1/2001 Rowe et al.
6,225,610 B1 * 5/2001 Walsh ........................ 219/505
6,278,919 B1 * 8/2001 Hwang et al. ................. 701/29
6,371,791 B1 4/2002 Newton, Jr.
6,431,880 B1 8/2002 Davis et al.
6,456,186 B1 * 9/2002 Oglesbee .................... 337/161
6,504,468 B2 1/2003 Lee et al.
6,583,977 B1 * 6/2003 Oglesbee .................... 361/104
6,629,619 B2 * 10/2003 Sato et al. .................. 220/4.02
6,753,754 B1 6/2004 Black et al.
2001/0027060 A1 * 10/2001 Kondo et al. ................ 439/620
2003/0045137 A1 * 3/2003 Yamane et al. ............. 439/76.2
2003/0077927 A1 * 4/2003 Momota et al. ............ 439/76.2
2004/0214458 A1 10/2004 Maebashi
2005/0150676 A1 * 7/2005 Higuchi et al. ................ 174/59

FOREIGN PATENT DOCUMENTS

EP 0793249 A2 9/1997
JP 08047144 A * 2/1996
JP 2002050275 A * 2/2002

OTHER PUBLICATIONS

International Search Report of PCT/US2005/046962; Oct. 9, 2006; 3 pages.

* cited by examiner

*Primary Examiner*—Anatoly Vortman
(74) *Attorney, Agent, or Firm*—Armstrong Teasdale LLP

(57) ABSTRACT

A power distribution block includes a housing, an input terminal and at least one output terminal extending from the housing. At least one fuse insertion opening is formed in the housing and configured for insertion of a fuse. Each fuse insertion opening includes a first fuse contact terminal and a second fuse contact terminal within and configured for electrical contact with an inserted fuse, and each first fuse contact terminal is coupled to the input terminal. The power distribution block also includes at least one relay each having a first relay contact and a second relay contact where each first relay contact is coupled to a respective one of the second fuse contact terminals, and each second relay contact is coupled to a respective one of the output terminals.

35 Claims, 6 Drawing Sheets

SWITCHABLE FUSED POWER DISTRIBUTION BLOCK

BACKGROUND OF THE INVENTION

This invention relates generally to power distribution blocks, and more specifically, to fused power distribution blocks.

Fuses are widely used as overcurrent protection devices to prevent costly damage to electrical circuits. Fuse terminals typically form an electrical connection between an electrical power source and an electrical component or a combination of components arranged in an electrical circuit. One or more fusible links or elements, or a fuse element assembly, is connected between the fuse terminals, so that when electrical current through the fuse exceeds a predetermined limit, the fusible elements melt and opens one or more circuits through the fuse to prevent electrical component damage Power distribution blocks and terminal blocks are sometimes utilized to collect a plurality of circuit elements, for example, fuses, in a central location in an electrical system. Some known fuse blocks are available that incorporate snap-together modules which together form a fuse panel. However, these snap-together modules are excessively large when a large number of fuses are to be held in the block. Such modules also involve costly, labor intensive assembly.

Existing fuse blocks also commonly include individually wired circuits within the block for power input. As such, when it is desired to power more than one circuit with the same power source, a jumper is installed for this purpose. Installation of jumpers, however, is costly, labor intensive, and time consuming. In addition, added circuits require the use of larger gauge wiring in order to handle the additional current load. Accommodation of additional loads and auxiliary circuits in, for example, automotive systems, with existing fuse blocks is therefore difficult.

Another problem with existing designs is the inability to easily disconnect the circuits from the power source during maintenance procedures. Typically individual fuses have to be removed to disconnect the power source from the load circuits. In some electrical systems, such as automotive systems, access to the fuses is often restrictive, and removing and reinstalling fuses can be inconvenient.

BRIEF DESCRIPTION OF THE INVENTION

In one aspect, a power distribution block is provided that comprises a housing, an input terminal extending from the housing, and at least one output terminal extending from the housing. The power distribution block further comprises at least one fuse insertion opening formed in the housing and configured for insertion of a fuse. Each fuse insertion opening comprises a first fuse contact terminal and a second fuse contact terminal within and configured for electrical contact with an inserted fuse and, each first fuse contact terminal is coupled to the input terminal, The power distribution block further comprises at least one switching element each comprising a first contact and a second contact, where each first contact is coupled to a respective one of the second fuse contact terminals, and each second contact is coupled to a respective one of the output terminals. The at least one switching element is substantially enclosed within the housing.

In another aspect, a power distribution block is provided that comprises a housing, an input terminal extending from the housing, and at least one fuse output terminal extending from the housing;. The power distribution block further comprises at least one fuse insertion opening formed in the housing and configured for insertion of a fuse. Each fuse insertion opening comprises a first fuse contact terminal and a second fuse contact terminal within and configured for electrical contact with an inserted fuse. Each first fuse contact terminal is coupled to the input terminal, and each second fuse contact terminal is coupled to a respective one of the fuse output terminals.

In another aspect, a power distribution system is provided which comprises a housing, an input member comprising an input terminal extending from the housing, and a plurality of fuse members each comprising a fuse output terminal extending from the housing. The power distribution system also comprises a plurality of fuses each comprising a first fuse contact and a second fuse contact. The housing is configured for insertion of the fuses, and the input member is configured for electrical contact with each first fuse contact. Each fuse member is configured for electrical contact with one of the second fuse contacts.

DETAILED DESCRIPTION OF THE INVENTION

Figure 1:
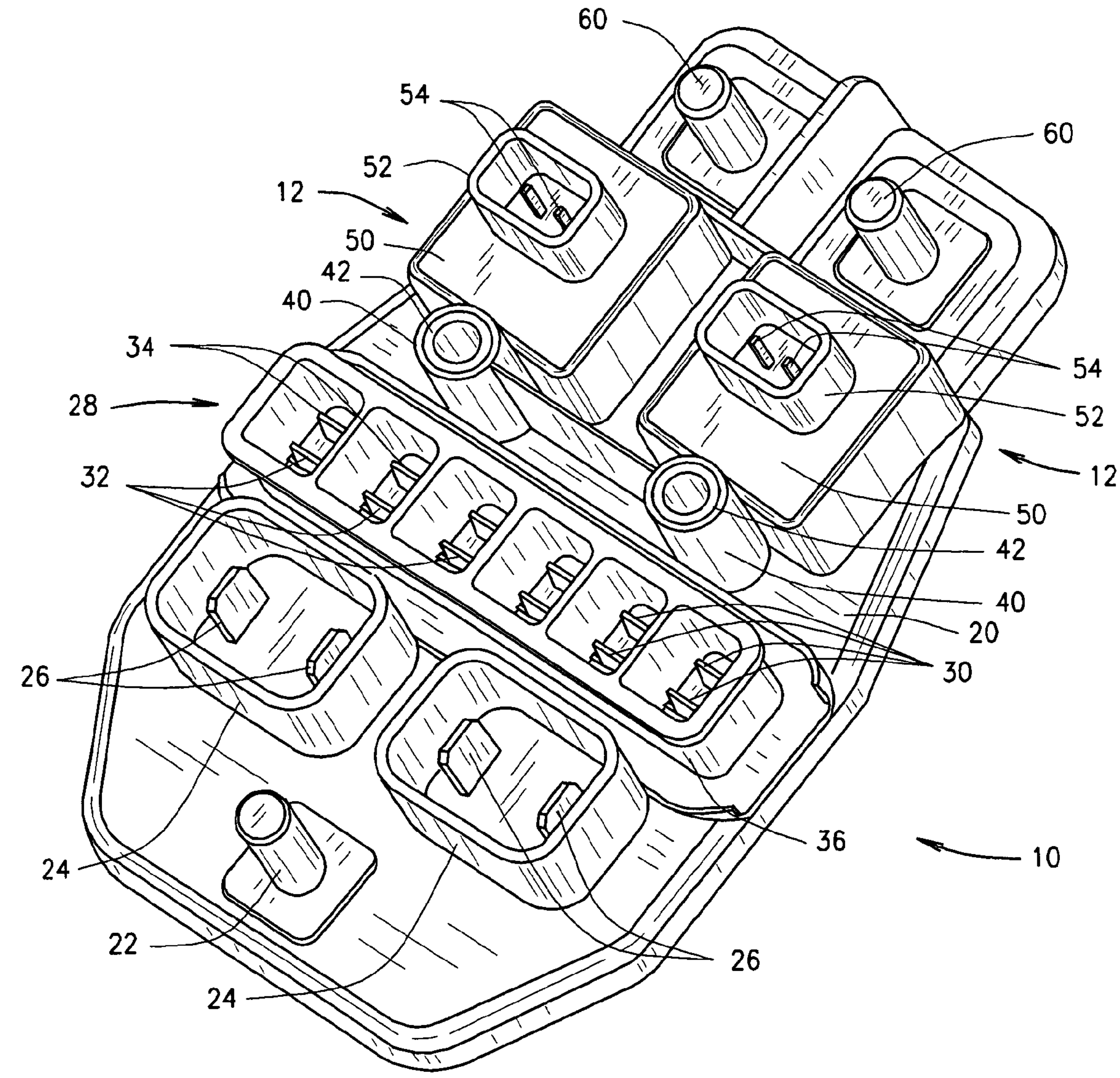
FIG. 1 is an illustration of an exemplary fused power distribution block.

FIG. 1 is an illustration of a fused power distribution block 10 which may be conveniently switched to connect or disconnect circuitry through the block 10 with, for example, relays 12. As further described herein, the power distribution block 10 provides a compact device and method for switching power, for example, battery power into a vehicle electrical center or as a standalone power switching unit. In various embodiments, further described below, the power distribution block 10 provides a user with one or more fused power outputs from which electrically powered units can receive power.

More specifically, the power distribution block 10 includes a housing 20 from which an input terminal 22 extends a plurality of connector mating protrusions or receptacles 24 each having one or more fuse output terminals 26 within, and a plurality of fuse insertion openings 28 formed thereon each having fuse terminals 30 therein. The housing 20 is formed from a molded plastic or a similar material that is not electrically conductive. The fuse insertion openings 28 and the fuse terminals 30 are configured for insertion of a female fuse (not shown), such that the contacts (not shown) of the fuses engage the fuse terminals 30. The fuse terminals 30 include a first fuse contact terminal 32 that is electrically connected to the input terminal 22 and a second fuse contact terminal 34 that is connected to one of the fused output terminals 26 or to one of the relays 12 as further described below. A fuse opening molding 36 forms a perimeter receptacle around the fuse insertion openings 28 and is configured to engage a fuse cover (not shown). In the embodiment illustrated, the first fuse contact terminal 32 and the second fuse contact terminal 34 are in a configuration that is sometimes referred to as blade terminals, or spade terminals which are received in female fuses, although it is appreciated that other types of terminals may be employed with other types of fuses in alternative embodiments.

Mounting members 40 are formed in the housing 20, and in the embodiment shown, the mounting members 40 are hollow and include a hollow insert 42 that provides strength for the mounting member 40. The mounting members 40 provide for the mounting of the power distribution block 10, for example, to a firewall of a vehicle, or other location in an electrical system utilizing screws, nuts and bolts, and/or other known fasteners.

As is shown in FIG. 1, the power distribution block 10 includes relay covers 50 which substantially surround a respective relay 12. The relay covers 50 each include relay signal receptacles 52 extending therefrom, and each relay receptacle has one or more relay control signal terminals 54 within. In various embodiments, the relay signal receptacles 52 are configured to engage a mating connector (not shown) which includes contacts configured to engage the relay control signal terminals 54 and provide signals for the control of the relays 12. Switchable output terminals 60 extend from the housing 20 and are electrically connected to a respective relay 12 as further described below. In some embodiments, the input terminal 22 and the switchable output terminals 60 are threaded studs which provide for connection to an external circuit utilizing a ring terminal or the like. Other embodiments for the input terminal 22 and the switchable output terminals 60 are also contemplated.

Figure 2:
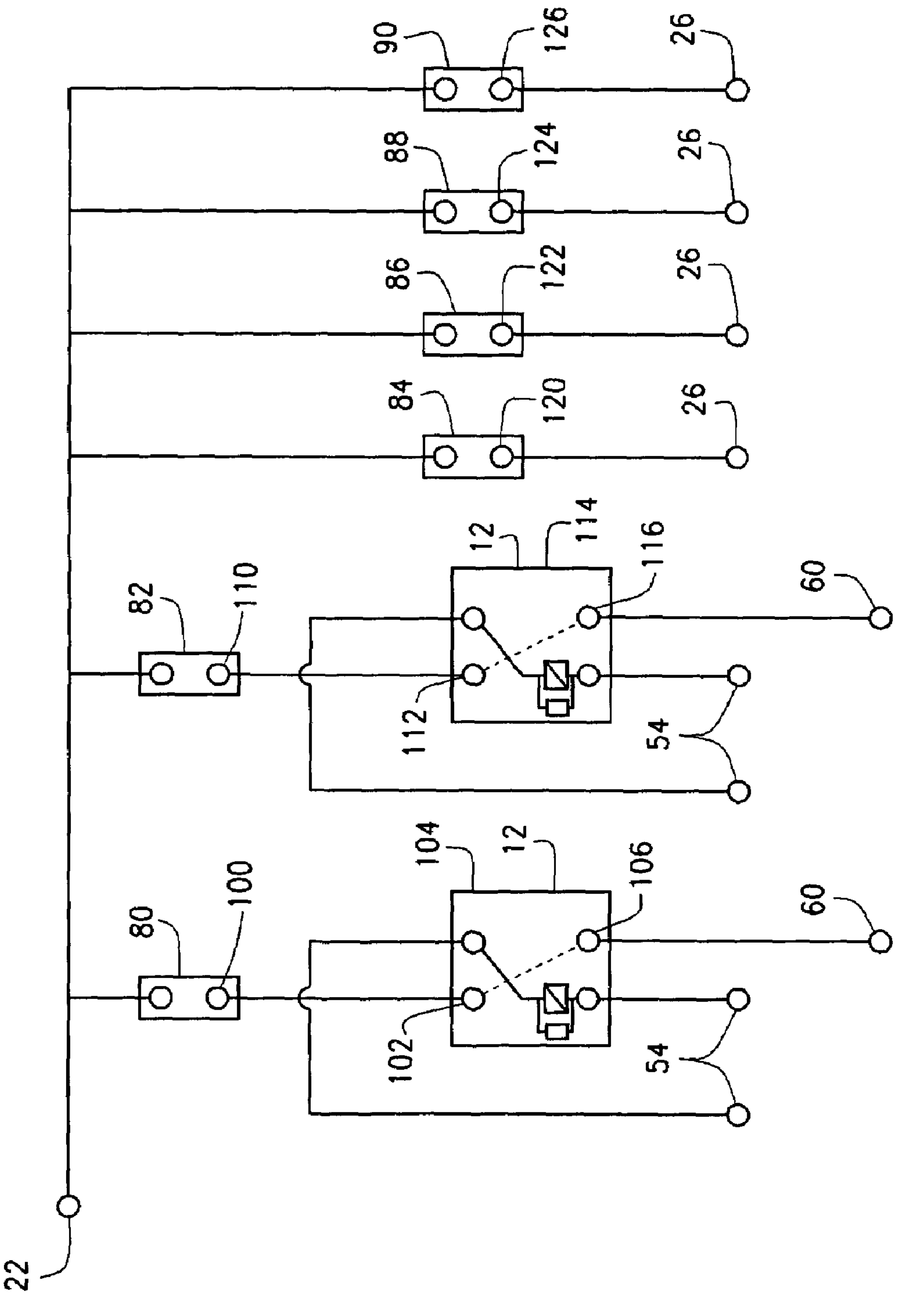
FIG. 2 is a schematic diagram of the fused power distribution block of FIG. 1.

FIG. 2 is a schematic diagram of the fused power distribution block 10 illustrating the electrical connections of the various components described with respect to FIG. 1. More specifically, the input terminal 22 is electrically connected to each of fuses 80, 82, 84, 86, 88, and 90 which, as described above, engage the respective fuse terminals 30 of the fuse insertion openings 28 (both shown in FIG. 1). For purposes of description, the fuses 80, 82, 84, 86, 88, and 90 are described herein as having a first contact and a second contact. The first contacts of the fuses 80, 82, 84, 86, 88, and 90 are commonly connected to the input terminal 22 via the first fuse contact terminals 32 (shown in FIG. 1). The second contacts of the fuses 80 and 82 are connected to the relays 12 via the respective second fuse contact terminals 34. More specifically, a second contact 100 of the fuse 80 is electrically connected via the respective second fuse contact terminal 34 to a first contact 102 of the first relay 104 and a second contact 106 of the first relay 104 is electrically connected to one of the switchable output terminals 60. A second contact 110 of the fuse 82 is electrically connected via the respective second fuse contact terminal 34 to a first contact 112 of the second relay 114, and a second contact 116 of the second relay 114 is electrically connected to another one of the switchable output terminals 60.

The second contacts 120, 122, 124, and 126, respectively of the fuses 84, 86, 88, and 90 are electrically connected via the respective second fuse contact terminal 34 to a respective one of fused output terminals 26. The relay control signal terminals 54 for control of the relays 12 (i.e., first relay 104 and second relay 114) are also illustrated in FIG. 2. While a double relay and six fuse configuration is shown in FIG. 2, alternative embodiments including a greater or fewer number of relays, and a greater or fewer number of fuses are contemplated.

Figure 3:
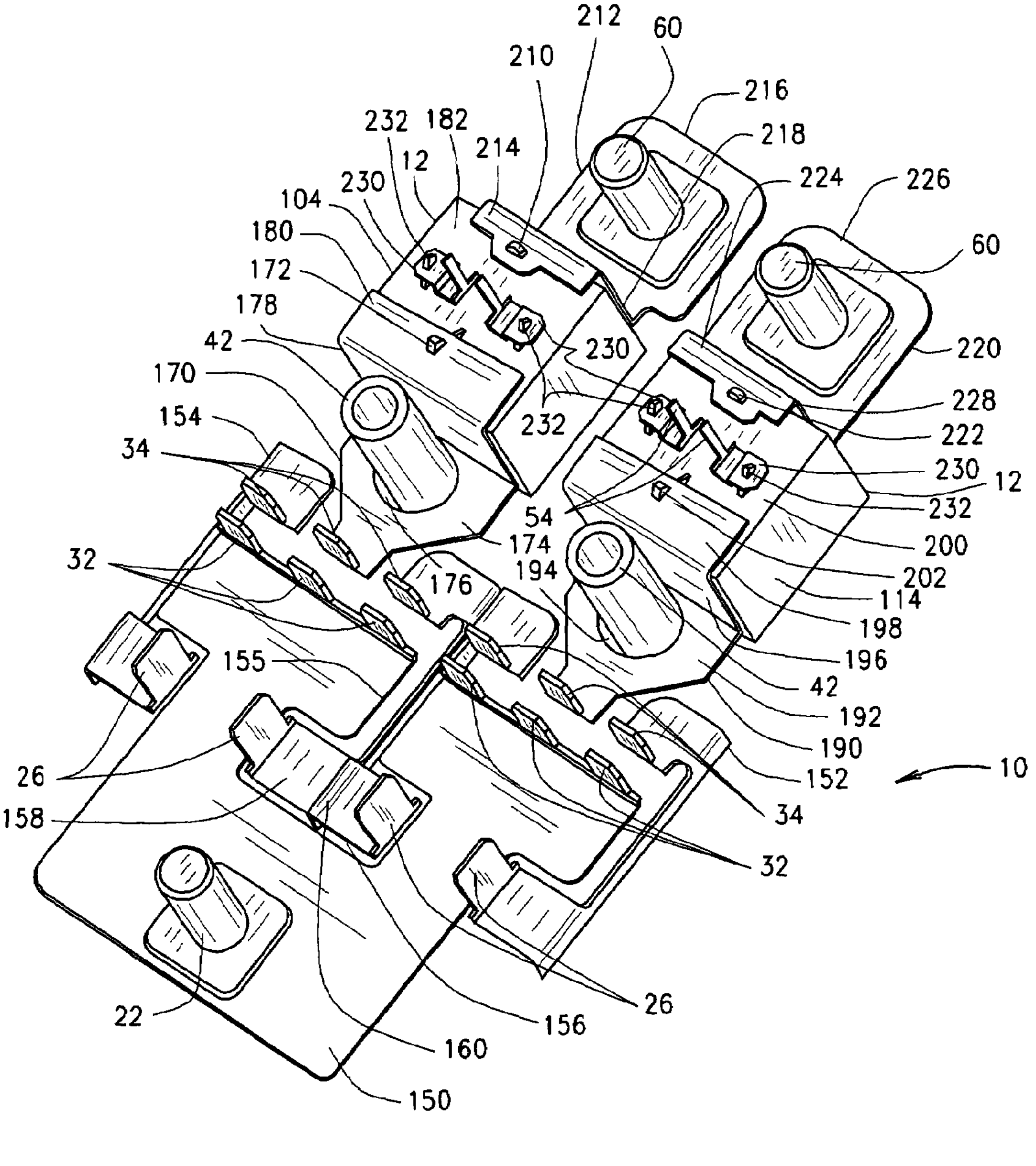
FIG. 3 is an illustration of the conductive members of the fused power distribution block of FIG. 1.

FIG. 3 illustrates the fused power distribution block 10 with the housing 12 (shown in FIG. 1) removed and showing the conductive portions of the power distribution block 10. Specifically, an input member 150 extends between the input terminal 22 and the electrically common first fuse contact terminals 32 which form a portion of the input member 150. A first outer fuse output conductor 152 extends around a portion of the input member 150 between one of the second fuse contact terminals 34 and one of the fused output terminals 26, both of which form a portion of the first outer fuse output conductor 152. A second outer fuse output conductor 154 also extends around a portion of the input member 150 opposite the first outer fuse output conductor 152 and between one of the second fuse contact terminals 34 and one of the fused output terminals 26, both of which form a portion of the second outer fuse output conductor 154. As illustrated in FIG. 3, the first outer fuse output conductor 152 and its respective second fuse contact terminal 34 and the fused output terminal 26 are formed as a single piece, as is the second outer fuse output conductor 154.

A slot 155 and an opening 156 are formed in the input member 150 allowing a first inner fuse output conductor 158 and a second inner fuse output conductor 160 to extend between the respective second fuse contact terminals 34 and the fused output terminals 26. More specifically, for the first inner fuse output conductor 158 and the second inner fuse output conductor 160, the respective fused output terminals 26 are located within the opening 156 and portions of the first inner fuse output conductor 158 and the second inner fuse output conductor 160 extend along slot 155. As illustrated, the first inner fuse output conductor 158 includes its respective second fuse contact terminal 34 and fused output terminal 26 as the first inner fuse output conductor 158 is formed as a single piece. Likewise, the second inner fuse output conductor 160 includes its respective second fuse contact terminal 34 and the fused output terminal 26 as it also is formed as a single piece.

As illustrated in FIG. 3, and as described above, two of the second fuse contact terminals 34 are electrically connected to the relays 104 and 114 respectively. A first relay contact conductor 170 includes and extends from its respective second fuse contact terminal 34 and makes electrical contact with a first contact 172 of the first relay 104. The first relay contact conductor 170 includes a first planar surface 174 having an aperture 176 formed therein which allows the hollow insert 42 to pass through without making electrical contact. A second planar surface 178 of the first relay contact conductor 170 extends from the first planar surface 174 at substantially a right angle along a side of the relay 104. A third planar surface 180 extends from the second planar surface 178 at substantially a right angle along a portion of a surface 182 of the relay 104 to make contact with the first contact 172 of the relay 104. A similarly configured second relay contact conductor 190 includes a first planar surface 192, an aperture 194 for the hollow insert 42, a second planar surface 196, and a third planar surface 198 which engages a surface 200 of the relay 114 and makes contact with the first contact 202 of the relay 114.

To provide contact with a second contact 210 of the relay 104, an output terminal conductor 212, which includes the switchable output terminal 60, is provided. The output terminal conductor 212 includes a contact mating portion 214 which extends along a portion of the surface 182 of the relay 104, and an output terminal member 216 from which the switchable output terminal 60 extends. A vertical conductor 218 extends between, and is substantially perpendicular to, the contact mating portion 214 and the output terminal member 216. A similarly configured output terminal conductor 220 provides contact with a second contact 222 of the relay 114 and includes a contact mating portion 224, an output terminal member 216, and a vertical conductor 228. Connector mating contacts 230 provide contact with a respective relay control contact 232, and are further configured to engage mating contacts within a mating connector as described above. The relay control signal terminals 54 each form a portion of each connector mating contact 230.

The fused power distribution block 10 (shown in FIGS. 1-3) is one embodiment of a power distribution block. Other embodiments which include more or fewer relays and more or fewer fuses are contemplated. Embodiments which include only fuses are also contemplated.

Figure 4:
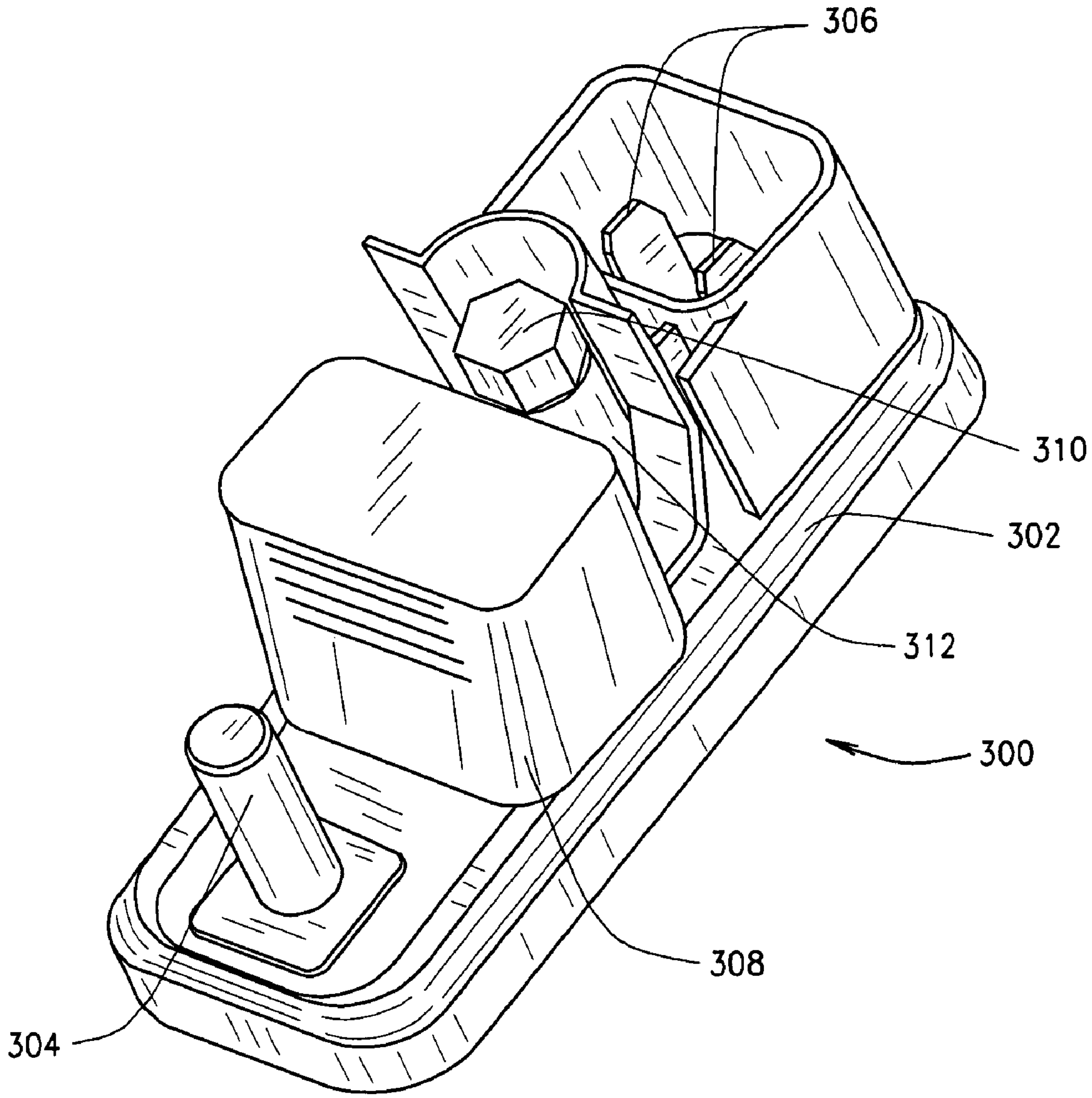
FIG. 4 is an illustration of an alternative embodiment of a fused power distribution block.

For example, FIG. 4 illustrates an embodiment of a power distribution block 300 which includes two fuses (not shown) but which does not include any relays. The power distribution block 300 has a housing 302 from which an input terminal 304 extends. The power distribution block 300 provides a fused connection from the input terminal 304 to two fused output terminals 306. Construction of the power distribution block 300 is similar to the power distribution block 10 (shown in FIGS. 1-3) in that input members (not shown in FIG. 4) extend from the input terminal 304 to first fuse contacts and output members (not shown in FIG. 4) extend from second fuse contacts (not shown in FIG. 4) to fused outputs 306. The power distribution block 300 further includes a fuse cover 308, which, in the embodiment illustrated, engages an fuse opening molding (not shown) surrounding the fuse insertion openings. Also illustrated is a head 310 of a mounting bolt that has been inserted through a mounting member 312.

Figure 5:
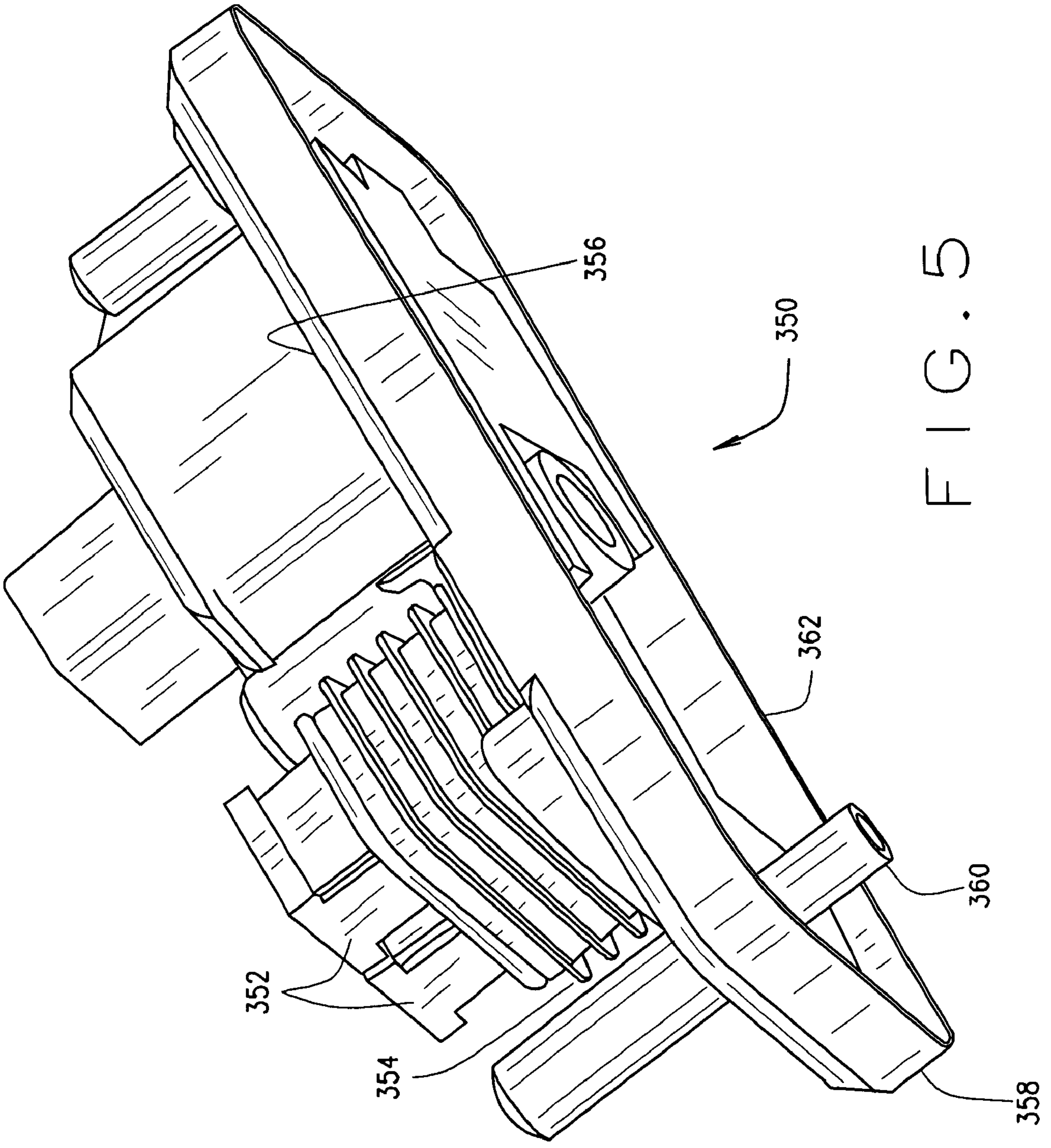
FIG. 5 is an illustration of another alternative embodiment of a fused power distribution block illustrating relays inserted therein.

FIG. 5 is an illustration of another alternative embodiment of a fused power distribution block 350 illustrating fuses 352 inserted therein. Also shown in FIG. 5, and applicable to the other embodiments illustrated and described herein, is a sealing member 354 which extends around a perimeter of the fuse insertion openings (e.g., fuse opening molding 36 shown in FIG. 1) and down to a base 356 of housing 358. Sealing member 354 is configured to engage a cover, for example, cover 308 (shown in FIG. 4) in order to provide a very robust seal to protect the fuses 352 inserted therein. Such a seal provides protection to the signal connections to the fuses 352. Further, the fused power distribution block 350 includes a molded pin 360 extending from a bottom 362 of housing 358 that provides an anti-rotation feature for embodiments that have only one mounting member (e.g., mounting member 312 shown in FIG. 4) when mounting the device.

Figure 6:
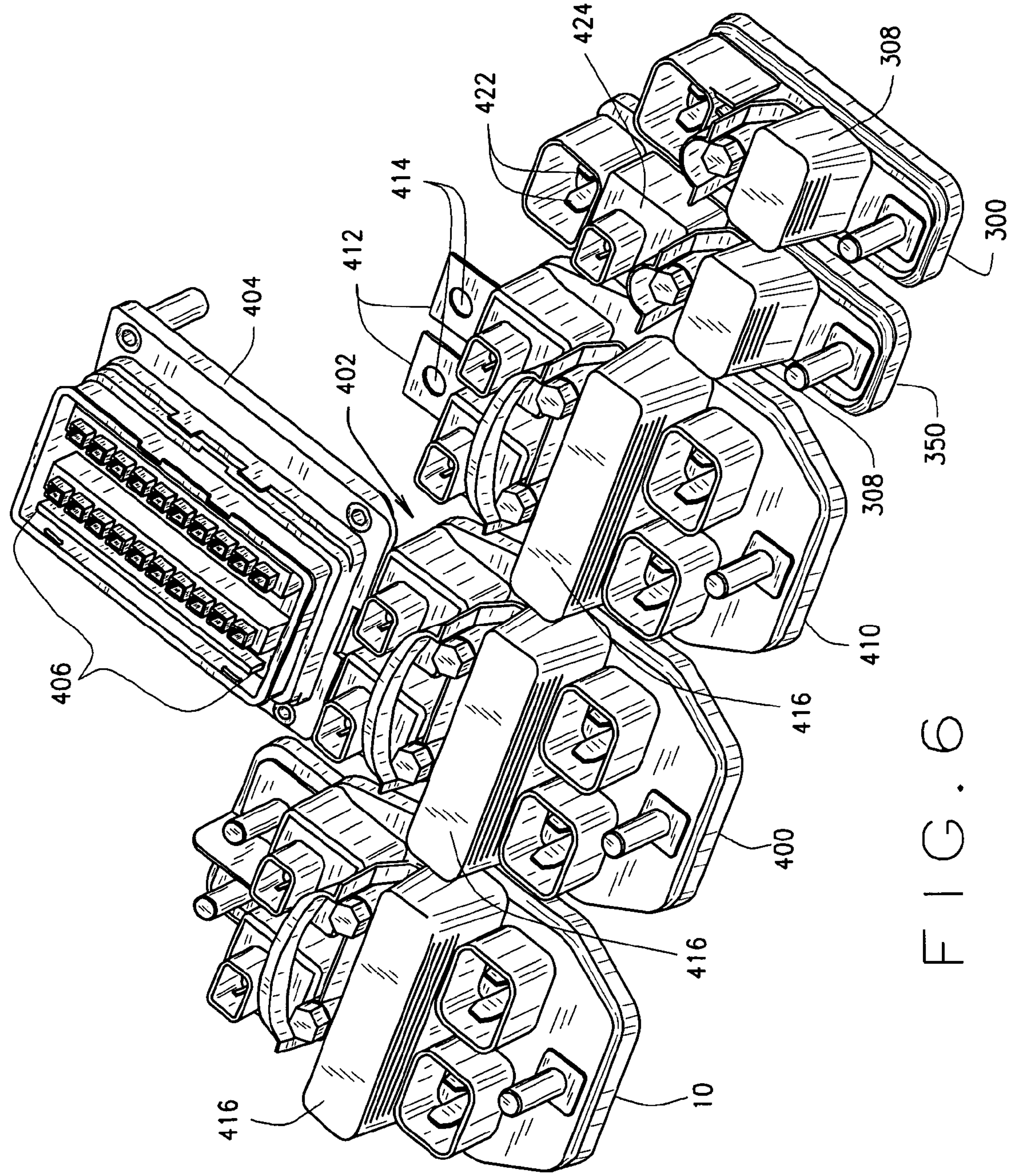
FIG. 6 is an illustration of multiple fused power distribution blocks, illustrating multiple embodiments of outputs.

FIG. 6 illustrates multiple embodiments of power distribution blocks including the above described power distribution blocks 10, 300, and 350. A power distribution block 400 is substantially similar to the power distribution block 10 except that its switchable output terminals 402 are configured to interface with an electrical connector 404 having multiple circuit contacts 406. A power distribution block 410 is also substantially similar to the power distribution block 10 except that it includes substantially flat switchable output terminals 412 for relay outputs having an aperture 414 formed therein for a circuit connection utilizing a known fastener. Flat switchable output terminals 412 may also be configured to engage a connector which slides onto the respective terminal 412. The power distribution blocks 10, 400, and 410 are each shown with a fuse cover 416 installed thereon that is configured to engage a sealing member that extend around perimeter of the fuse insertion openings as described above. The fuse cover 416 (and associated sealing member) is configured similarly to fuse cover 308 (also shown in FIG. 4) other than its size. Specifically, the fuse cover 416 is sized to engage fuse opening molding 36 (shown in FIG. 1).

Power distribution block 350 incorporates two fused outputs 422, with a single relay 424 in series with one of the fused outputs 422. As will be appreciated, all embodiments of the power distribution blocks described herein incorporate conductive members similar to those above described, for example, the input member, fuse output conductors, relay contact conductors, and output terminal conductors shown in FIG. 3.

The power distribution blocks described herein provide a low-cost and compact solution for the switching of electrical power. In addition, the power distribution blocks lessen dependencies on separate relay and fuse blocks which are discretely wired into electrical systems. Further the power distribution blocks are simple to fabricate as they incorporate printed circuit board mountable relays and plug in fuses. The bussing provided, for example, by input member 150, outer fuse members 152 and 154, inner fuse members 158 and 160, relay contact members 170 and 190, and output terminal contact members 212 and 220 (all shown in FIG. 3), is achieved with simple stamping processes to form the various members, providing an ease of fabrication.

In addition to the above, the power distribution blocks described herein also provide a distribution panel that is tolerant of harsh environments. After the necessary electrical connections described herein are made utilizing the conductive members, the entire assembly is inserted into a waterproof housing. More specifically, and in one embodiment, housings (i.e., housings 20 and 302) provide a waterproof housing for the electrical devices (fuses, relays) therein as they are insert molded around those devices thereby protecting the electrical devices.

While the invention has been described in terms of various specific embodiments, those skilled in the art will recognize that the invention can be practiced with modification within the spirit and scope of the claims.

What is claimed is:

1. A power distribution block comprising:

a single housing integrally formed with a plurality of fuse insertion receptacles and at least one switch element receptacle;

a first fuse contact terminal and a second fuse contact terminal within each of said plurality of fuse insertion receptacles;

a power input terminal extending from said housing, the first fuse contact terminal in each of the fuse insertion receptacles being mechanically and electrically connected to the power input terminal;

a switching element substantially enclosed within the at least one switch element receptacle, the switching element comprising a first contact and a second contact, the second fuse contact terminals in each of the fuse insertion receptacles being mechanically and electrically connected to the first contact of the switching element; and a power output terminal extending from said housing, said second contact of the switching element being mechanically and electrically connected to said power output terminal.

2. The power distribution block according to claim 1, wherein said at least one switching element comprises at least one relay.

3. The power distribution block according to claim 1, further comprising output terminals being unconnected to either of the input terminal or the output terminal.

4. A power distribution block according to claim 3 wherein a first end of one of said output terminals is located within one of the fuse insertion receptacles.

5. A power distribution block according to claim 4, the housing further comprising an output receptacle separate from the fuse insertion receptacles, and a second end of one of said output terminals is located in the output receptacle.

6. The power distribution block according to claim 1 wherein one of the power input terminal and the power output terminal comprises a stud.

7. The power distribution block according to claim 1 wherein said first and second fuse contact terminals are configured to engage a female fuse.

8. The power distribution block according to claim 1 further comprising:

a sealing member configured to extend around a perimeter of the plurality of fuse insertion receptacles; and a fuse cover configured to engage said sealing member.

9. The power distribution block according to claim 1, further comprising at least one of a mounting protrusion and an anti-rotation pin, said anti-rotation pin configured to extend from a bottom of said housing.

10. The power distribution block according to claim 1, wherein said housing further comprises at least one switching signal receptacle integrally formed therein, said power distribution block further comprising at least one switching control signal terminal situated within the relay switching signal receptacle.

11. The power distribution block according to claim 10, wherein said at least one switch signal receptacle is configured to engage a respective mating connector.

12. The power distribution block according to claim 1, wherein said power input terminal, said first fuse contact terminal, said second fuse contact terminal, and said power output terminal are molded within said housing.

13. The power distribution block according to claim 1, wherein said housing is injection molded, said at least one switching element molded within said housing.

14. The power distribution block according to claim 1, wherein said housing defines a plurality of switch element receptacles.

15. The power distribution block of claim 14, further comprising a plurality of power output terminals, each of said power output terminals respectively connected to one of the switching elements.

16. The power distribution block according to claim 1, wherein the fuse insertion receptacles are positioned alongside the at least one switch element receptacle.

17. The power distribution block according to claim 1, wherein the housing further comprises a switch element signal receptacle formed integrally with the fuse insertion receptacles, the switch element signal receptacle extending transverse to the fuse insertion receptacles.

18. The power distribution block according to claim 1, wherein the housing further comprises a switch element signal receptacle formed integrally with the fuse insertion receptacles, the switch element signal receptacle and the fuse insertion receptacles each being accessible from above the housing.

19. The power distribution block according to claim 1, wherein the housing further comprises an output receptacle formed integrally with the fuse insertion receptacles, the output receptacle and the fuse insertion receptacles each being accessible from above the housing.

20. The power distribution block according to claim 1, wherein the housing further comprises an output receptacle formed integrally with the fuse insertion receptacles, the output receptacle oriented generally transverse to the fuse insertion receptacles.

21. The power distribution block according to claim 1, wherein the first fuse contact terminal and a second fuse contact terminal comprise blades projecting upwardly from the housing within the fuse insertion receptacles.

22. The power distribution block according to claim 1, wherein the housing further comprises at least one output receptacle formed integrally with the fuse insertion receptacles, the power distribution block further comprising fuse output terminals located in the at least one fuse output receptacle, the fuse output terminals comprising blades projecting upwardly from the housing within the fuse insertion receptacles.

23. The power distribution block according to claim 22, wherein the blades of the fuse output terminals are located at substantially a 90° angle to the blades of the fuse insertion receptacles.

24. The power distribution block according to claim 1, wherein each of the fuse insertion receptacles are configured to individually receive a female fuse.

25. A power distribution block comprising:

a housing having a plurality of fuse insertion receptacles and at least one fuse output receptacle integrally formed therein;

a power input terminal extending from said housing; and first and second fuse output terminals extending from said housing within said fuse output receptacle; and each of the fuse insertion receptacles comprising a first fuse contact terminal and a second fuse contact terminal, the first and second fuse contact terminals each including contact blades projecting from the housing, each of the first fuse contact terminals mechanically and electrically connected to the input terminal, and each of the second fuse contact terminals mechanically and electrically coupled to respective ones of the first and second fuse output terminals.

26. The power distribution block according to claim 25, wherein the first and second fuse output terminals, the first and second fuse contact terminals, and the power input terminal are molded within said housing.

27. The power distribution block according to claim 25, wherein the first and second fuse output terminals include contact blades projecting from said housing within the at least one output receptacle, the contact blades of the fuse output terminals oriented at substantially a 90° angle to the contact blades of the first and second fuse contact terminals.

28. The power distribution block according to claim 25, wherein the fuse insertion receptacles are configured to individually receive female fuses.

29. The power distribution block according to claim 25, wherein the at least one output receptacle and the fuse insertion receptacles are each accessible from above the housing.

30. A power distribution system comprising:

a fuse block comprising:

a single housing defining a plurality of integrally formed fuse insertion receptacles and a plurality of fuse output receptacles;

a power input terminal extending from said housing;

fuse output terminal blades extending from said housing within the fuse output receptacles; and pairs of fuse contact terminal blades each respectively located in the fuse insertion receptacles; wherein one of each pair of the fuse contact terminal blades is mechanically and electrically connected to the power input terminal, and the other of each pair of the fuse contact terminal blades is mechanically and electrically connected to one of the fuse output terminal blades; and a plurality of female fuses each comprising a first fuse contact and a second fuse contact, the plurality of female fuses being insertable into the fuse insertion receptacles with the first and second fuse contacts receiving the pair of fuse contact terminal blades.

31. The power distribution system according to claim 30, wherein the power input terminal, the fuse output terminal blades, and the fuse contact terminal blades are molded within said housing.

32. The power distribution system according to claim 30 further comprising:

a power output terminal; and at least one relay comprising a first relay contact, a second relay contact, and at least one relay control signal terminal;

wherein at least one of the fuse output terminal blades is mechanically and electrically connected to one of the first and second relay contacts.

33. The power distribution system according to claim 32, wherein said housing is injection molded around the at least one relay, thereby substantially enclosing the at least one relay within the housing.

34. The power distribution block according to claim 32 wherein the housing further comprises at least one relay signal receptacle formed integrally therein, and the power distribution block further comprises at least one relay control signal terminal located within the relay signal receptacle.

35. The power distribution block according to claim 30 further comprising:

a sealing member configured to extend around the fuse insertion receptacles; and a fuse cover configured to engage said sealing member, said fuse cover configured to cover said plurality of inserted fuses.

* * * * *